US006573998B2

United States Patent
Cohen-Sabban

(10) Patent No.: US 6,573,998 B2
(45) Date of Patent: *Jun. 3, 2003

(54) OPTOELECTRONIC SYSTEM USING SPATIOCHROMATIC TRIANGULATION

(75) Inventor: Joseph Cohen-Sabban, Aix En Provence (FR)

(73) Assignee: Cynovad, Inc., Quebec (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,197

(22) PCT Filed: Jun. 11, 1997

(86) PCT No.: PCT/IB97/01406
§ 371 (c)(1),
(2), (4) Date: Nov. 1, 1999

(87) PCT Pub. No.: WO99/24786
PCT Pub. Date: May 20, 1999

(65) Prior Publication Data
US 2002/0075484 A1 Jun. 20, 2002

(51) Int. Cl.$^7$ .......................... G01B 11/14; G01B 11/24
(52) U.S. Cl. ....................... 356/602; 356/612
(58) Field of Search ................. 356/601, 602, 356/603, 610, 612; 250/201.2, 201.4, 201.8

(56) References Cited

U.S. PATENT DOCUMENTS 5,018,854 A * 5/1991 Rioux .................... 356/376

FOREIGN PATENT DOCUMENTS

| JP | 07128027 | * 5/1995 |
| WO | WO 96/41123 | * 12/1996 |

* cited by examiner

Primary Examiner—Michael P. Stafira
(74) Attorney, Agent, or Firm—Cantor Colburn LLP

(57) ABSTRACT

In accordance with the teachings of the present invention, an optoelectronic system (10) is provided for surface digitization of an object using spatiochromatic triangulation. The optoelectronic system (10) includes an illuminating subsystem (12) for illuminating a measuring space (30) that contains an object (16) to be measured, as well as a viewing subsystem (14) for collecting the light reflected by this object (16) and for generating a three-dimensional topography of the object (16) using in depth chromatic coding of the object. More specifically, relay optics (22) are used to image a polychromatic light source (20) onto a source slit (24) which in turn passes images from the slit image onto a dispersing element (26). The object to be measure is illuminated with a continuum of monochromatic images along a cutting, plane (x,z) within the measuring space (30). A color coded (x, λ) representation, generated by the intersection of the cutting plane (32) and the surface of the measured object (16), is imaged onto a viewing slit of an imaging spectrograph. A relay lens (50) is used for projecting this image onto the viewing slit (42). A grayscale imaging array (46) located in the image plane of the spectrograph (40) registers the color coded representation, and by using spectrophotometric analysis, an image processor (40) translates this representation into a plane section of the three-dimensional topography of the measured object (16).

18 Claims, 6 Drawing Sheets

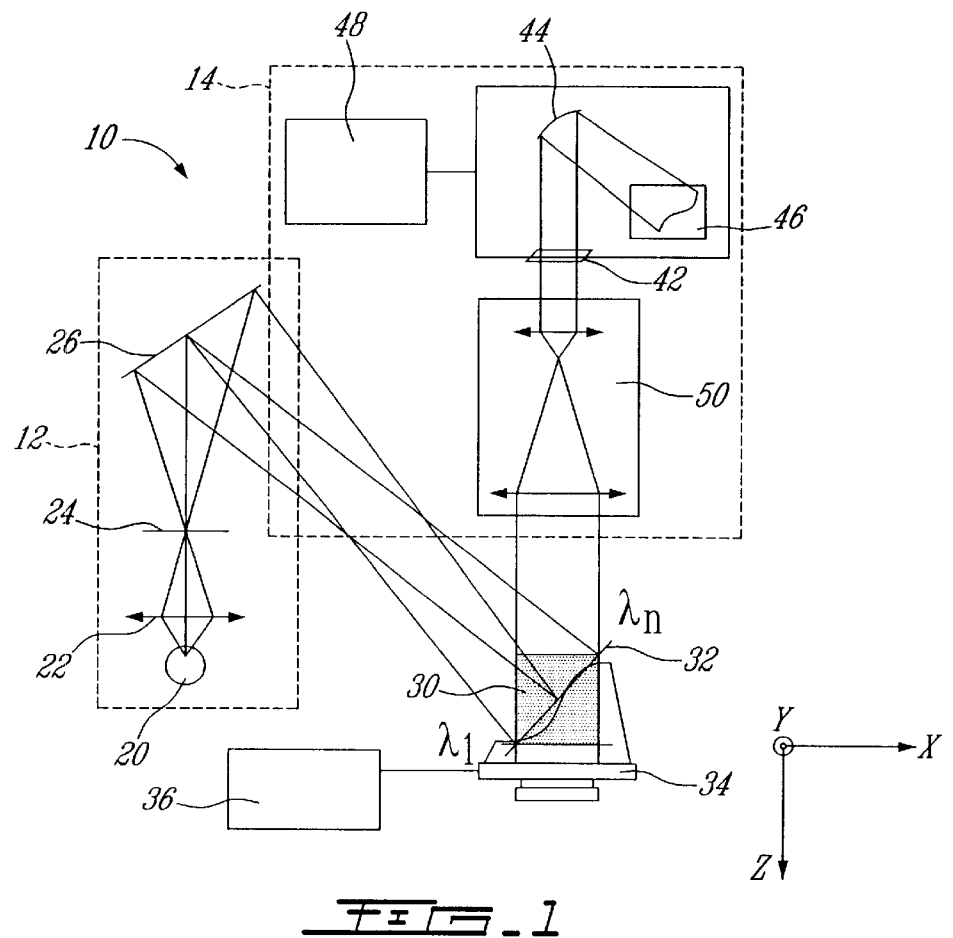
FIG_1
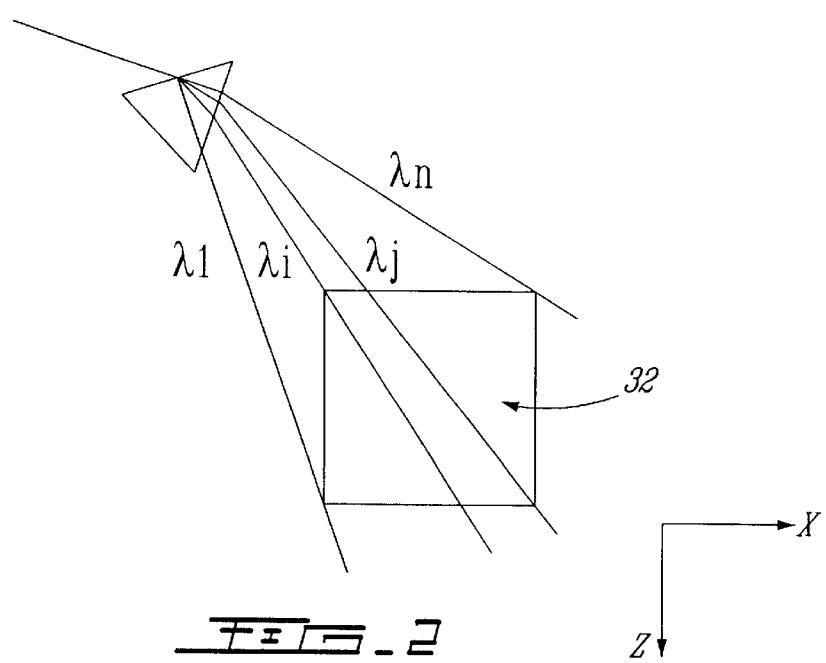
FIG_2

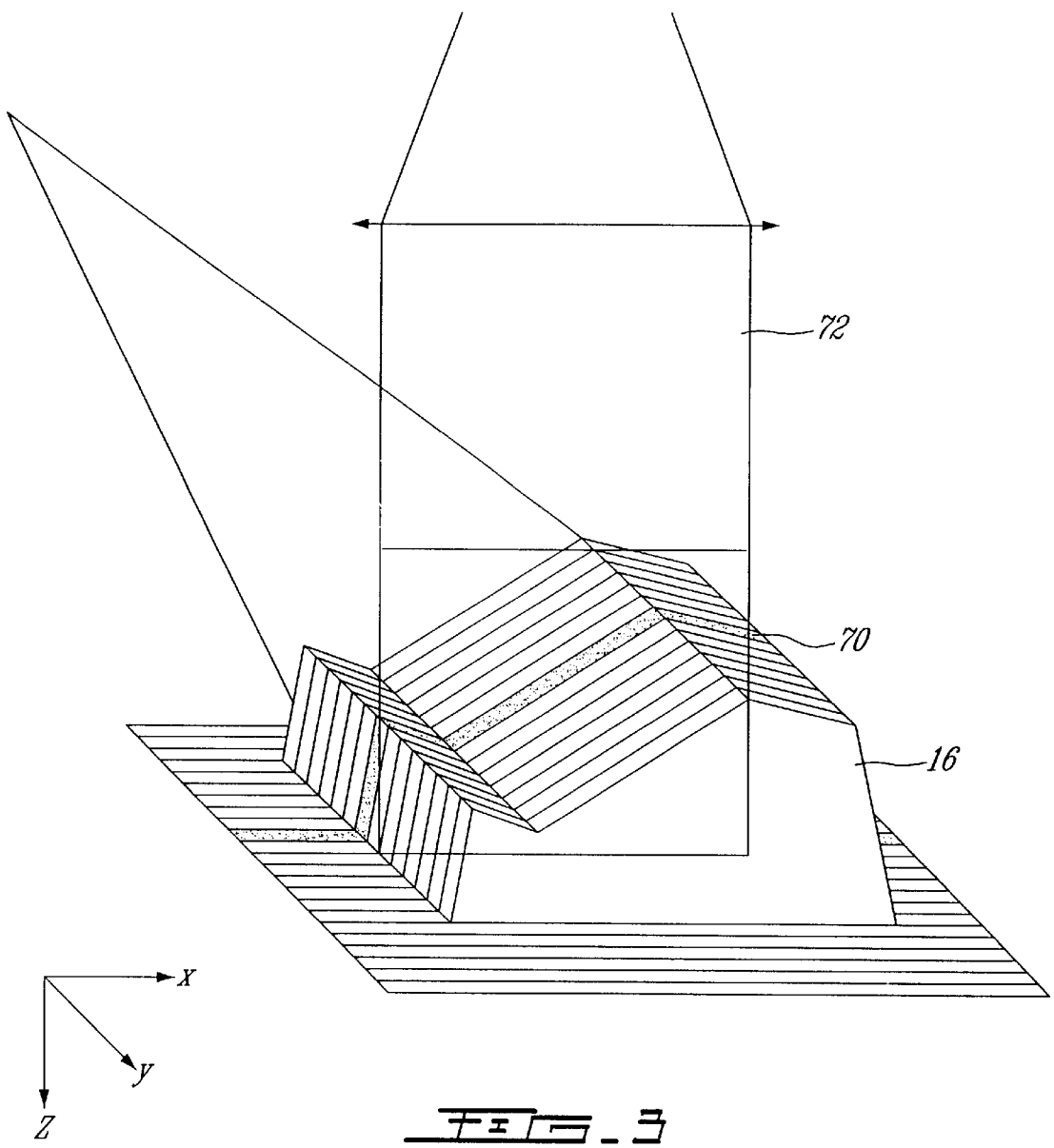

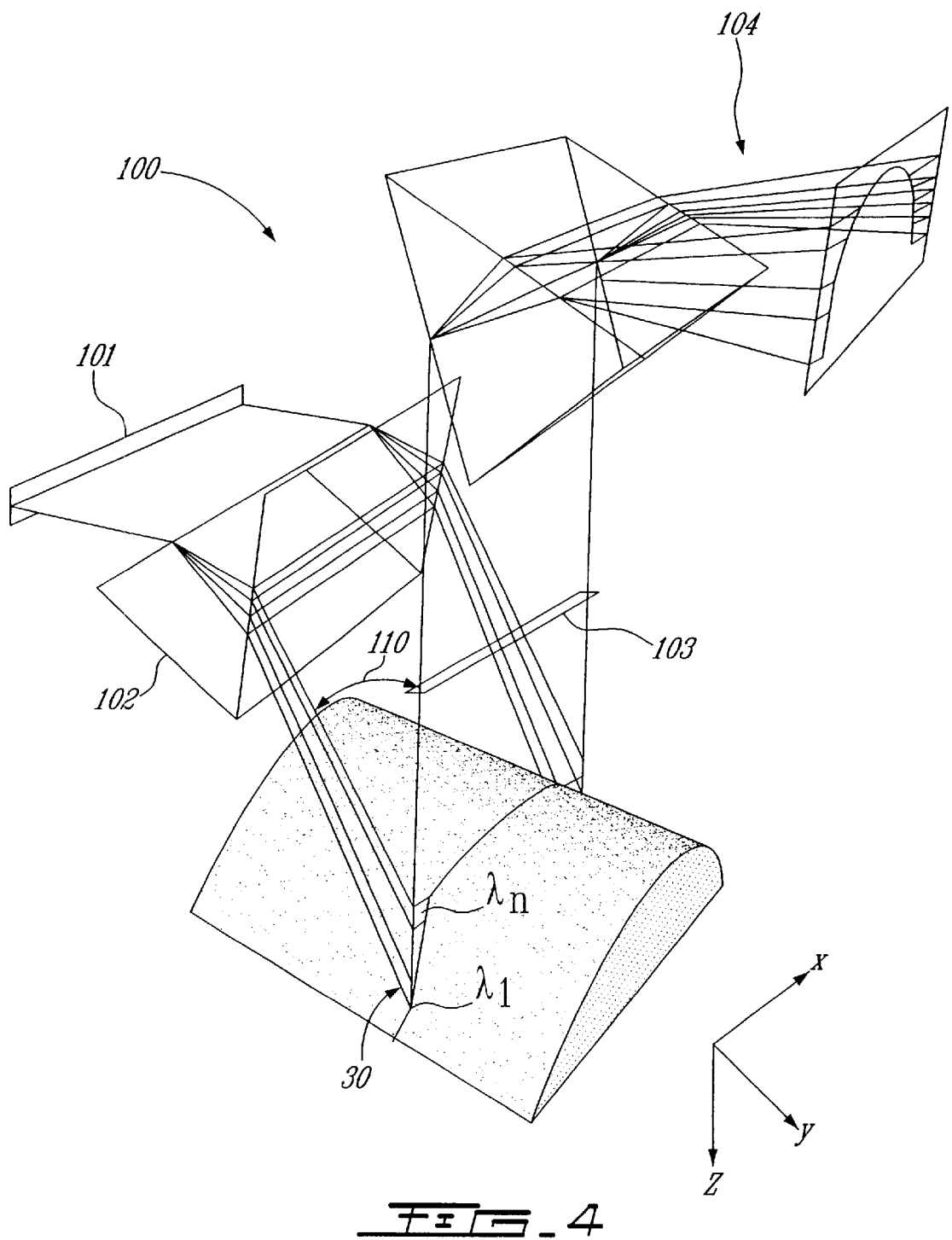
FIG_4

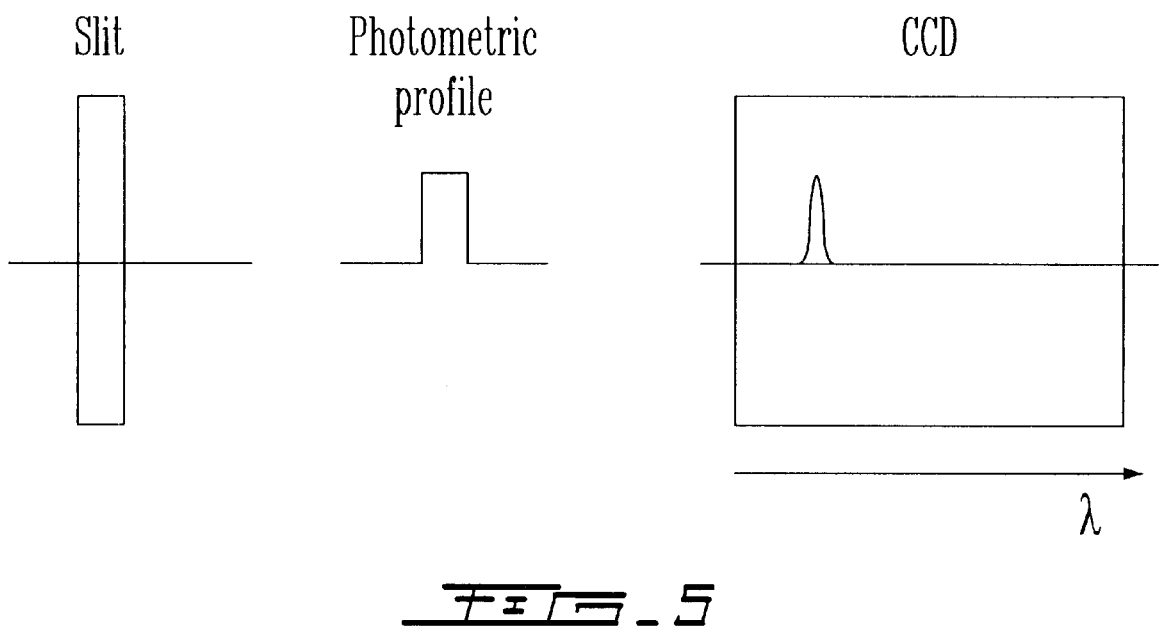
FIG_5
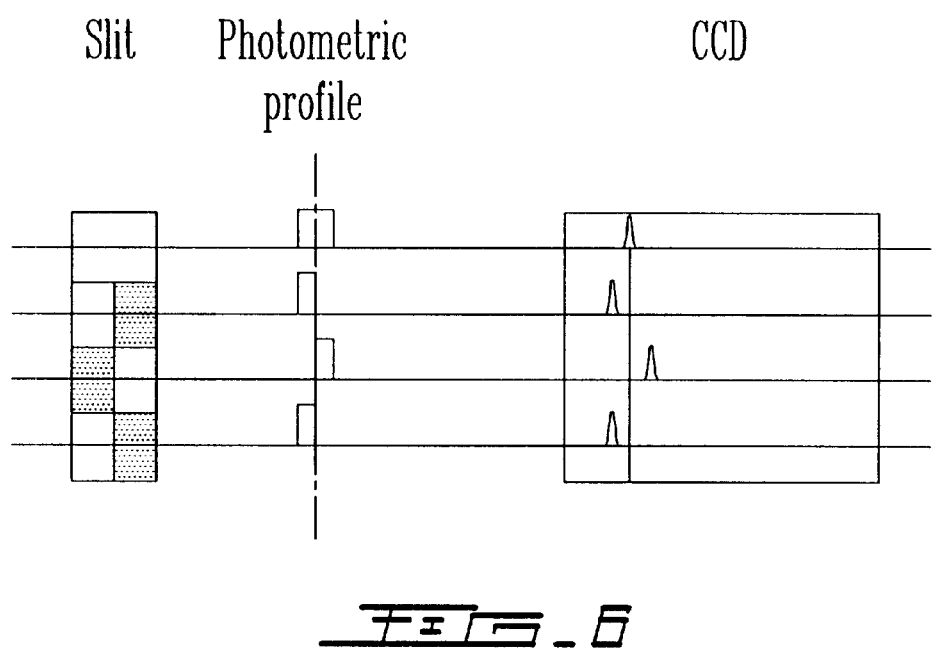
FIG_6

Random photometric microstructure
Random shift of the gaussian profiles barycenters
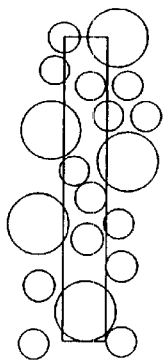 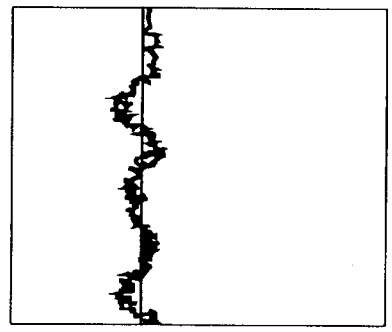
FIG_7
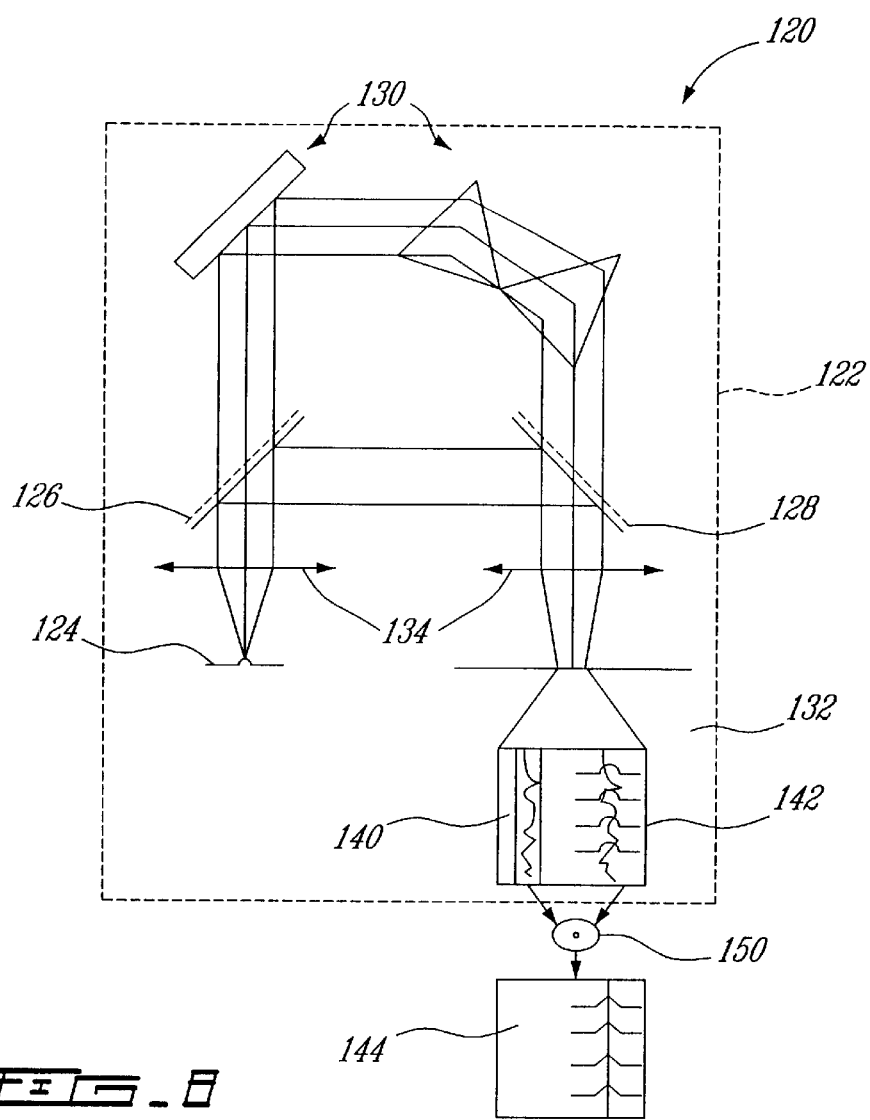
FIG_8

Spatial shift of the slit illumination barycenter
Reconstruction of the real spectral composition of each point along the slit
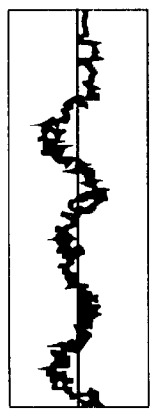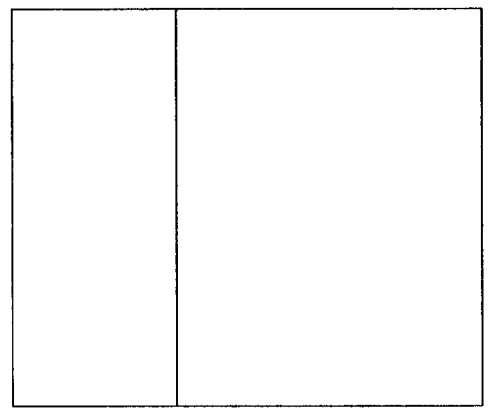
FIG_9

the following description of the present invention is

OPTOELECTRONIC SYSTEM USING SPATIOCHROMATIC TRIANGULATION

BACKGROUND OF THE INVENTION

1. Technical Field

This invention relates to an optoelectronic system, and more particularly to an optoelectronic device that provides non-contact, real time surface digitization of an object using spatiochromatic triangulation.

2. Discussion of Related Art

An increased development of digitization of mock-ups and models for further treatment on CAD systems has led to a need for more effective surface sensing capability in optoelectronic systems. Other measuring and gauging applications, such as scanning machine parts, also requires improved surface digitization. Optoelectronic devices using monochromatic triangulation techniques are a generally well known means for generating a non-contact surface digitization. These techniques often employ coherent light sources that are able to obtain resolutions up to 1 part in $10^4$ depth of field on most types of material. However, systems using coherent sources are susceptible to interference which may create optical noise in the digitization process. In addition, monochromatic triangulation techniques are sensitive to variations in light intensity due to interference effects and surface conditions.

Therefore, it is desirable to provide a high resolution and cost effective optoelectronic system for use with conventional light sources. An optoelectronic system using spatiochromatic triangulation provides non-contact, real time surface digitization of an object. Furthermore, it is desirable to provide a system with a non-coherent light source that results in a measurement technique that is primarily independent of light intensity. Two basic triangulation configurations of the optoelectronic system may be implemented. An "in plane" and a "v-shape" configuration, where the latter configuration decreases the triangulation angle between the light source and viewing plane of the spectrograph and thus avoids occlusion problems associated with conventional triangulation measurement techniques.

Additionally, a surface microstructure compensation technique incorporated into the present optoelectronic system corrects measurement errors caused by surface imperfections.

SUMMARY OF THE INVENTION

In accordance with the teachings of the present invention, an optoelectronic system is provided for surface digitization of an object using spatiochromatic triangulation. The optoelectronic system includes an illuminating subsystem for illuminating a measuring space that contains an object to be measured, as well as a viewing subsystem for collecting the light reflected by this object and for generating a three-dimensional topography of the object using in depth chromatic coding of the object. More specifically, relay optics are used to image a polychromatic light source onto a source slit which in turn passes the slit image onto a dispersing element. The object to be measure is illuminated with a continuum of monochromatic images along a cutting plane (x,z) within the measuring space. A color coded (x, λ) representation, generated by the intersection of the cutting plane and the surface of the measured object, is imaged onto a viewing slit of an imaging spectrograph. A relay lens is used for projecting this image onto the viewing slit. A grayscale imaging array located in the image plane of the spectrograph registers the color coded representation, and by using spectrophotometric analysis, an image processor translates this representation into a plane section of the three-dimensional topography of the measured object.

BRIEF DESCRIPTION OF THE DRAWINGS

Other objects and advantages of the present invention will be apparent to those skilled in the art upon reading the following detailed description and upon reference to the drawings in which:

FIG. 1 is a block diagram showing a first embodiment of a optoelectronic system employing an "in plane" configuration of the present invention;

FIG. 2 illustrates the continuum of monochromatic projections across a measuring space in the first embodiment of the present invention;

FIG. 3 shows a three dimensional reconstruction of the surface of a measured object with successive parallel cutting planes defined across its y-axis.

FIG. 4 is a diagram showing a second preferred embodiment of an optoelectronic system employing a "v-shape" configuration of the present invention;

FIG. 5 illustrates the spectrophotometric profile and gaussian profile from a homogeneously illuminated viewing slit in an imaging spectrograph;

FIG. 6 illustrates the effect of microscopic reflectance irregularities (as imaged on a viewing slit) on the spectrophotometric profile and the corresponding measurement errors as registered by an imaging array in a spectrograph;

FIG. 7 illustrates the random shift of the gaussian profiles (light intensity profiles) caused by surface irregularities in the measured object;

FIG. 8 is a diagram showing a surface microstructure compensation technique incorporated into the viewing subsystem of the optoelectronic device in the present invention; and FIG. 9 illustrates the reconstruction of the real spectral composition from a slit image captured directly from the light intensities on the viewing slit of a spectrograph.

DETAILED DESCRIPTION OF THE PREFERRED EMBODIMENT

The following description of the present invention is merely exemplary in nature and is in no way intended to limit the invention or its uses. Moreover, the following description, while depicting an optoelectronic system using spatiochromatic triangulation for determining a three-dimensional topography of an object, is intended to adequately teach one skilled in the art to make and use an optoelectronic system for a variety of measurement applications using in depth chromatic coding of an object surface.

An optoelectronic system 10, including an illuminating subsystem 12 for illuminating an object 16 across a cutting plane 32 and a viewing subsystem 14 for collecting the light reflected by the object 16 and for generating a three-dimensional topography of the object 16, is illustrated in FIG. 1. In this first embodiment of the present invention, the components of optoelectronic system 10 are shown in an "in plane" configuration.

Illuminating subsystem 12 comprises a polychromatic light source 20 that illuminates a continuous spectrum through relay optics 22 which focus the source onto a first slit 24 oriented along the y-axis. Polychromatic light source 20 may be an incandescent light source, an Arc lamp (i.e., Xenon Arc) having a continuous spectrum and functioning in either a continuous or a flash mode, or other light sources optically coupled together in order to provide a large spectral bandwidth (i.e., superradiant diodes or light emitting diodes LEDs). Light source 20 may also be located remotely from illuminating subsystem 12 and delivered through a fiber optic medium or other medium to illuminating subsystem 12.

The image from source slit 24 passes through a dispersing element 26 prior to illuminating a measuring space 30. Dispersing element 26 may comprise a prism, concave diffraction grating, diffraction lens, or other dispersing optics that function to illuminate a three-dimensional measuring space 30 with a continuum of monochromatic images oriented in the y-dimension. Cutting plane 32 is a measuring plane defined by the x-axis and z-axis of a coordinate system located in measuring space 30. Dispersing element 26 may also focus these images at nominal focus points in measuring space 30.

Generic wavelengths from $\lambda_1$ to $\lambda_n$ are shown extending across cutting plane 32 in FIG. 2, and thus providing in depth chromatic coding of the surface of a measured object. The wavelength range of the light beams corresponds to the spread of impinging polychromatic light beam being delivered by light source 20.

Referring to FIG. 1, for the "in plane" configuration a pinhole may be used in place of slit 24, resulting in a continuum of monochromatic point images together forming a plane in measuring space 30. This approach illuminates only that part of the object 16 visible to the viewing subsystem 14, placing higher tolerances on mutual alignment of illuminating subsystem 12 and viewing subsystem 16, while reducing optical power required of light source 20 and reducing possible interference effects from light not directly viewed by 16.

Object 16 to be measured may be partially or completely located inside measuring space 30. To displace cutting plane 32 along the surface of object 16, the object in the preferred embodiment is firmly fastened to a motorized mechanical means 34. Mechanical means 34 then operates to translate object 16 along the y-axis and/or to rotate object 16 about any given axis in order to acquire successively all of the views of the surface of object 16 necessary to complete its examination/representation. Those skilled in the art will appreciate that mechanical means may include a variety of drive assemblies and motors, for example, the ATS100 series manufactured by Aerotech, Inc. of Pittsburgh, Pa. An encoder/control module 36 is also coupled to mechanical means 34 for electronically driving and synchronizing mechanical means 34.

Viewing subsystem 14 comprises an imaging spectrograph 40 having a viewing slit 42 in parallel alignment with the x-axis of measuring space 30. The image plane of spectrograph 40 aligns with an image created by the intersection of cutting plane 32 and the measuring surface of object 16. A relay lens 50 having a large depth of field serves to demagnify this image onto viewing slit 42 of spectrograph 40. Internal to spectrograph 40, a dispersing element 44 projects this image onto a grayscale imaging array 46 which is located in the image plane of spectrograph 40. To improve resolution, imaging array 46 should map the height of its array to the full spectrum of wavelengths used in the system. A charge coupled device (CCD) or other similar device known in the art may be employed as the imaging array 46. An image data processor 48, such as a digital signal processor or a general purpose computer, is coupled to spectrograph 40 for recording, processing and visualizing measurements of object 16 as registered by imaging array 46.

Imaging optics 50 may be positioned inside and/or outside of spectrograph 40. Since telecentric optics are not practical for imaging large measuring spaces (e.g., high quality lens >1 inch in size are expensive to manufacture), viewing subsystem 14 may be configured without telecentric optics. Classic relay lens or other non-telecentric optics may replace telecentric optics in the present invention provided a complementary pupil transport is added in front of viewing slit 42. Since telecentric optics are used to ensure a constant magnification over the entire depth of field, a software implemented correction is preferably used in conjunction with non-telecentric optics.

In operation, measured object 16 is placed into measuring space 30 which is illuminated with a continuum of monochromatic images from light source 20 that has passed through dispersing element 26. As a result, an in depth chromatic coding of the surface of measuring object 16 occurs and the wavelength of the light reflected by measured object 16 will translate into an z-axis measurement. In other words, a color coded (x,$\lambda$) representation of cutting plane (x,z) is imaged onto slit 42 of spectrograph 40 and then registered by grayscale imaging array 46. Due to perspective and optical distortion, the image is only representative of the surface of the measured object 16. However, through the use of a mathematical mapping generated during a calibration process of optoelectronic system 10, image processor 48 can reconstruct a digitized contour line equivalent to the surface of object 16 along cutting plane 32. For a given contour line the signal on imaging array 46 appears as a curved line with a transverse gaussian profile whose position along imaging array 46 depends on the spectral content of the corresponding point on the surface of object 16. Various signal processing techniques may be employed by image processor 48 to determine the barycenter of the gaussian profile and thus determine a corresponding z measurement.

Although some applications of optoelectronic system 10 may only utilize a single contour line from the surface of an object, other applications will need a digitized reconstruction of its entire surface area. As best seen in FIG. 3, since only one cutting plane 70 aligns with the image plane 72 of spectrograph (not shown), additional measurements along successive parallel cutting planes will be needed to reconstruct the surface of object 16. Therefore, in order to measure the entire surface area, mechanical means 34 must translate object 16 (along the y-axis) with respect to the image pane of a fixed spectrograph. In an alternate approach to measuring this surface area, measured object 16 may be fastened to an immovable holding member so that viewing subsystem 14 is translated (along the y-axis) with respect to fixed object 16. In either case, spectrophotometric analysis of each successive cutting plane image leads to the three dimensional topography of object 16.

In the first embodiment of the present invention, optoelectronic system 10 is referred to as an "in plane" configuration. In this "in plane" configuration, referring back to FIG. 2, the resolution of the left side of measuring space 30 is limited to the wavelengths from $\lambda_1$ to $\lambda_i$, and similarly the right side of measuring space 30 is limited to the wavelengths from $\lambda_j$ to $\lambda_n$. To improve resolution in the present invention, a broad range of wavelengths should correlate to z measurements along the x-axis. Although increasing the triangulation angle will increase the resolution for this z-axis measurement, it also contributes to an occlusion problem caused by the object relief obstructing the illuminating image.

A second preferred embodiment, in FIG. 4, utilizes a "v-shape" configuration to reduce the triangulation angle in the optoelectronic system 100 of the present invention. In this preferred embodiment, a source slit 101 and viewing slit 103 are both in parallel alignment with the y-axis of measuring space 30. By turning the viewing subsystem 103 and 104 90° about the z-axis the resolution of z measurements takes advantage of the entire spectrum of wavelengths in the system. Furthermore, triangulation angle 110 can be significantly reduced without losing the full advantage of the entire spectrum of wavelengths from $\lambda_1$ to $\lambda_n$. Optoelectronic system 100 can otherwise include all of the basic system components (or variations) as discussed in FIG. 1.

For the "v-shape" configuration correction for perspective distortions can be made by orienting the grayscale imaging array 46 in such a manner as to have the wavelength oriented along the columns and the x-axis oriented along the rows. If telecentric optics were used the measured position of z is a function of row number R and the measured points along the x-axis are approximately a linear function of the column number C. That is, $$Z=f_z(R)=a_0+a_2R$$

$$X=f_x(C)=b_0+b_1C$$

where x and z=measured points in the field-of-view

R and C=row and column of a point in image array

These equations are only strictly true for telecentric optics. For an embodiment of the present invention using non-telecentric imaging optics, perspective distortions must be compensated for by adding some x-dependence into the calculation of $f_z$, as well as adding some z-dependence into the calculation of $f_x$. Therefore, the general modelling of this problem is represented by:

$$Z=f_z(R,C)=a_0+a_1C+a_2R+a_3RC$$

$$X=f_x(R,C)=b_0+b_1C+b_2R+b_3RC$$

Polynomials of the above form can solve the perspective problem in a non-telecentric system. Positioning a calibration target in front of a sensor at n positions will provide samples of $Z_1 \ldots Z_n, Y_1 \ldots Y_n, R_1 \ldots R_n$ and $C_1 \ldots C_n$, and thus provide sufficient information to provide a least-squares solution to identify the $a_j$ and $b_i$ coefficients. Additional nonlinear components, such as $a_iR^jC^k$ and/or $b_iR^jC^k$, may be added to the above equation to compensate for other optical/geometric distortions. Accordingly, as will readily be recognized by those skilled in the art, a software-implemented correction modelled from the above equations can be used to resolve the perspective problem in the absence of telescopic optics in the present invention. A similar process may be implemented to correct for distortions in the "in-plane" configuration.

Optoelectronic system 100 of the preferred embodiment has been realized in a 267 mm×172 mm×68 mm sensor weighing 3 kg. The sensor uses a 50 W Tungsten Halogen lamp as its light source and a ½" hyper HAD type CCD from Sony having 646 (spectral direction)*484 pixel resolution. The viewing slit is 20 micrometers wide and 5 millimeters high and is made of a chromium plated thin glass plate (1.5 mm×15 mm). The slit is imaged through the spectrograph onto the CCD by a telecentric combination of two achromatic doublets (73 mm focal length and 17 mm in diameter). The mean dispersion is 0.62 nanometer per pixel on the CCD thus allowing 400 nanometers spectral range (comprised between 500 and 900 nanometers) to be imaged on the CCD. Using a "v-shape" configuration, optoelectronic system 100 achieves spatial resolution of 100*130 µm for x,y and less than 10 µm for z measurements.

In an imaging spectrograph, the entrance slit width is assumed to be homogeneously illuminated, and when illuminated by a light source having a small spectral width ($\Delta\lambda$) its image on a monochromatic imaging array will have a gaussian profile as seen in FIG. 5. Unlike monochromatic triangulation methods, the performance of an optoelectronic system based on spatiochromatic triangulation is affected by the width of the spectrograph slit and the surface imperfections on the measured surface. If the slit is too narrow, the signal passed is too low; whereas if the slit is made wider, more light passes through the slit, but the image becomes increasingly "lumpy". The light reflected from the target surface includes "lumpy" distortions caused by surface imperfection in the measured object. To illustrate this problem, consider a flat target, with a checkerboard pattern as shown in FIG. 6, as viewed by a spectrograph. The location of the mean (barycenter) of the light distribution within the slit varies along the slit, and thus leads to misinterpretation of the signal when imaged through the spectrograph. The top profile from FIG. 6 is centered as the light is distributed evenly on the slit; whereas the bottom three profiles each exhibit asymmetrical offsets due to a variation in the light intensity imaged at the slit. The position of the light requires centering in the slit for an accurate mapping of the light onto the spectrograph, otherwise these offset variations will be translated into measurement errors. Similarly, measuring a surface with microscopic reflectance irregularities will create measurement errors when digitizing the topography of an object. For example, in the "v-plane" configuration of the present invention, a flat target surface should result in an image with the same wavelength (i.e., same color). However, the presence of surface imperfections can cause an apparent red shift or blue shift in the imaged signal which is incorrectly interpreted as depth variations in the flat target surface.

The optoelectronic system according to the present invention preferably uses a surface microstructure compensation technique to overcome this problem. In particular, as shown in FIG. 8, the optoelectronic system of the present invention further includes a set of beam splitters interposed into the image plane of a spectrograph 122. A first splitter 126 is located between a viewing slit 124 of spectrograph 122 and dispersing elements 130; whereas a second splitter 128 is positioned between dispersing elements 130 and a monochromatic imaging array 132. First splitter 126 and second splitter 128 are used to generate a slit image 140 directly from the light intensities on viewing slit 124. By allocating part of imaging array 132 to slit image 140, one single imaging array can be used for profiling slit image 140 and the image 142 passed through spectrograph 122. Relay lens 134 may also be incorporated into viewing subsystem 120.

Referring to FIG. 7, a random spectrophotometric microstructure from the measured surface results in a random shift of gaussian profiles as registered by the imaging array of a spectrograph. In FIG. 9, measurements of the light intensity from viewing slit 124 as captured in slit image 140 are then used to reconstruct the actual spectral composition of each point along viewing slit 124. As will be apparent to one skilled in the art, an image processor 150 may be used to read the centers of light intensities from slit image 140 and then to use this information to remove the apparent red and blue shifts that occur in spectrograph image 142. As a result of this surface microstructure compensation technique, image processor 150 can produce a corrected image 144. In an alternative approach, a second imaging array (not shown) may be placed before the second splitter 128 for registering split image 140.

A method for surface digitization of an object using spatiochromatic triangulation will now be described. First, a polychromatic light source, that may also pass through a relay lens, is imaged onto a source slit. Next, the slit image passes through a dispersing element, and thus providing in depth chromatic coding of the object by illuminating a measuring space (containing the object) with a continuum of monochromatic images. The image plane of an imaging spectrograph aligns with the surface of the object and an imaging array located in the image plane registers an image of the object. Finally, an image processor generates a digitized contour line from the object.

The foregoing discloses and describes merely exemplary embodiments of the present invention. One skilled In the art will readily recognize from such discussion, and from the accompanying drawings and claims, that various changes, modifications and variations can be made therein without departing from the spirit and scope of the present invention.

What is claimed is:

1. An optoelectronic system for surface digitization of an object using spatiochromatic triangulation, said system comprising:

an illumination subsystem for illuminating said object to be measured across a measuring space;

a viewing subsystem for collecting the light reflected by said object in said measuring space and for generating a three-dimensional topography of said object using in depth chromatic coding of said object; and an image processor for processing a registered image into a digitized contour line.

2. The optoelectronic system of claim 1 wherein said illuminating subsystem includes:

a polychromatic light source;

a source slit illuminated by said light source;

optics for imaging said light source onto said source slit; and a dispersing element for passing said slit image into said measuring space with a continuum of monochromatic images, wherein said object located in said measuring space.

3. The optoelectronic system of claim 2 wherein said viewing subsystem includes an imaging spectrograph having a viewing slit for forming an image plane, whereby an image of the surface of said object aligns with said image plane, and an imaging array located in said image plane for registering said image.

4. The optoelectronic system of claim 3 further comprising relay optics positioned in said image plane for projecting said image onto said viewing slit.

5. The optoelectronic system of claim 1 further comprising a mechanical means for translating said object within said measuring space, wherein said object is fastened to said mechanical means, and an electronic controller for driving and synchronizing said mechanical means.

6. The optoelectronic system of claim 3 wherein a z-axis is defined in said measuring space along the depth dimension of said object, wherein said source slit and said viewing slit are in parallel alignment by rotating said viewing subsystem 90° about said z-axis, thereby utilizing the entire spectrum of wavelengths from said light source to determine a depth measurement of said object.

7. The optoelectronic system of claim 3 wherein said viewing subsystem includes:

a first beam splitter interposed in said image plane between said viewing slit and said dispersing element for generating a direct slit image; and at least one imaging array for viewing both a dispersed image having passed through said dispersing element and said direct slit image, whereby said direct slit image is used to compensate for apparent wavelength shifts in said dispersed image.

8. An optoelectronic device for surface digitization of an object using spatiochromatic triangulation, said device comprising:

a polychromatic light source;

relay optics positioned in an illuminating plane of said light source for imaging said light source onto a source slit;

a concave diffraction grating for illuminating a measuring space with a continuum of monochromatic images along a measuring cutting plane providing in depth chromatic coding of said object, wherein said object located in said measuring space;

an imaging spectrograph having a viewing slit whose image plane aligns with an image generated by the intersection of said cutting plane and the surface of said object; and a grayscale imaging array located in said image plane of said spectrograph for registering said image.

9. The optoelectronic system of claim 8 wherein said source slit is further defined as a pinhole for forming point images.

10. The optoelectronic system of claim 8 further comprising a telecentric relay lens for projecting said image onto said viewing slit.

11. The optoelectronic system of claim 8 further comprising a relay lens for projecting said image onto said viewing slit and an image processor for correcting perspective distortion.

12. The optoelectronic system of claim 8 further comprising an image processor coupled to said imaging array for processing said registered image using spectrophotometric analysis and generating a digitized contour line from said object.

13. The optoelectronic system of claim 8 further comprising a mechanical means for translating said object within said measuring space and an electronic controller for driving and synchronizing said mechanical means, wherein said object is fastened to said mechanical means and by translating said object a plurality of images are registered along successive parallel cutting planes to reconstruct a topography of said object.

14. A method for surface digitization of an object using spatiochromatic triangulation, comprising:

imaging a light source onto a source slit;

illuminating a measuring space with a continuum of monochromatic images by passing said slit image through a dispersing element;

providing in depth chromatic coding of said object, where said object located in said measuring space; and registering an image of the surface of said object which aligns with image plane on an image spectrograph.

15. The method of claim 14 wherein said imaging spectrograph includes an imaging array located in said image plane for registering said image.

16. The method of claim 14 further comprising the step of generating a digitized contour line from said object using spectrophotometric analysis.

17. The method of claim 16 wherein an image processor is coupled to said imaging array for processing said image into a digitized contour line.

18. The method of claim 14 further comprising the step of translating said object within a measuring space using a mechanical means, whereby translating said object a plurality of images are registered along successive parallel cutting planes to reconstruct a topography of said object.

* * * * *